US009715389B2

(12) United States Patent
Spadini et al.

(10) Patent No.: US 9,715,389 B2
(45) Date of Patent: Jul. 25, 2017

(54) DEPENDENT INSTRUCTION SUPPRESSION

(71) Applicant: Advanced Micro Devices, Inc., Sunnyvale, CA (US)

(72) Inventors: Francesco Spadini, Austin, TX (US); Michael Achenbach, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 616 days.

(21) Appl. No.: 13/926,193

(22) Filed: Jun. 25, 2013

(65) Prior Publication Data
US 2014/0380024 A1 Dec. 25, 2014

(51) Int. Cl.
*G06F 9/30* (2006.01)
*G06F 9/38* (2006.01)

(52) U.S. Cl.
CPC ............ *G06F 9/3834* (2013.01); *G06F 9/384* (2013.01); *G06F 9/3836* (2013.01); *G06F 9/3838* (2013.01); *G06F 9/3842* (2013.01); *G06F 9/3861* (2013.01)

(58) Field of Classification Search
CPC ....................................................... G06F 9/38
See application file for complete search history.

(56) References Cited

U.S. PATENT DOCUMENTS

| 6,249,862 | B1* | 6/2001 | Chinnakonda ...... G06F 9/30036 712/218 |
| 6,385,715 | B1* | 5/2002 | Merchant ................ G06F 9/383 712/218 |
| 6,735,688 | B1 | 5/2004 | Upton |
| 6,981,129 | B1 | 12/2005 | Boggs |
| 2003/0126406 | A1 | 7/2003 | Hammarlund |
| 2008/0028193 | A1 | 1/2008 | Dhodapkar |
| 2013/0013862 | A1 | 1/2013 | Kannan |
| 2014/0025933 | A1 | 1/2014 | Venkataramanan |
| 2014/0181476 | A1 | 6/2014 | Srinivasan et al. |

OTHER PUBLICATIONS

U.S. Appl. No. 13/926,184, filed Jun. 25, 2013, entitled "Dependence-Based Replay Suppression".
U.S. Appl. No. 13/943,264, filed Jul. 16, 2013, entitled "Dependent Instruction Suppression".
U.S. Appl. No. 13/943,310, filed Jul. 16, 2013, entitled "Dependent Instruction Suppression in a Load-Operation Instruction".
Non-Final Office Action mailed Dec. 18, 2015 in U.S. Appl. No. 13/943,264, 19 pages.
Non-Final Office Action mailed Feb. 1, 2016 in U.S. Appl. No. 13/943,310, 30 pages.

(Continued)

*Primary Examiner* — Cheng-Yuan Tseng

(57) ABSTRACT

A method includes suppressing execution of at least one dependent instruction of a load instruction by a processor using stored dependency information responsive to an invalid status of the load instruction. A processor includes an execution unit to execute instructions and a scheduler. The scheduler is to select for execution in the execution unit a load instruction having at least one dependent instruction and suppress execution of the at least one dependent instruction using stored dependency information responsive to an invalid status of the load instruction.

23 Claims, 4 Drawing Sheets

(56) References Cited

OTHER PUBLICATIONS

Non-Final Office Action mailed Nov. 24, 2015 in U.S. Appl. No. 13/962,184, 14 pages.
Final Office Action mailed Mar. 17, 2016 in U.S. Appl. No. 13/926,185, 20 pages.
Advisory Action mailed Jun. 22, 2016 in U.S. Appl. No. 13/926,184, 2 pages.
Notice of Allowance mailed Jun. 29, 2016 in U.S. Appl. No. 13/943,264, 20 pages.
Notice of Allowance mailed Jul. 6, 2016 in U.S. Appl. No. 13/943,310, 13 pages.
Notice of Allowance mailed Nov. 21, 2016 in U.S. Appl. No. 13/926,184, 17 pages.

* cited by examiner

DEPENDENT INSTRUCTION SUPPRESSION

BACKGROUND

Field of the Disclosure

The present disclosure generally relates to processors, and more particularly, to suppression of dependent instructions.

Description of the Related Art

Processors typically enhance processing efficiency by employing out-of-order execution, whereby instructions are executed in an order different from the program order of the instructions. In replay processors, in addition to out-of-order execution, instructions may be executed speculatively based on an assumption that the memory subsystem will provide requested data prior to the execution of the instruction. For example, a speculative load may be executed based on the assumption that a previous store will have been completed so that the data for the load is available. A scheduler in the processor schedules and tracks speculatively executed instructions. Data from the speculative load may be used by other instructions to perform other operations. These other instructions are referred to as dependent instructions. A dependent or child instruction is an instruction having one or more operands that depend on the execution of other instructions. Multiple levels of dependency may be present in that a particular parent instruction may have a dependent child instruction, and the child instruction may have its own dependent instruction(s). In a single cycle scheduler, when an instruction is picked, it immediately awakes its dependents, who do the same in turn. If this chain goes uninterrupted, the chain of dependent instructions of a load may be described as a "wave front." It is difficult to interrupt this wave front if it is discovered that the ancestor load instruction had invalid status due to the timing critical awake-pick path in a such a scheduler.

A speculatively executed load instruction may generate invalid results due to a load failure, because the memory subsystem is not ready to provide the data for the load. In response to identifying the invalid status of a speculatively executed instruction, the scheduler may replay or reissue the instruction with the invalid status and any of its dependents that had also been speculatively executed(s) in the wave front so that they can be executed with the correct operands. Because the scheduler speculatively issues instructions that span multiple levels of dependency, the number of instructions subject to replay may be significant. Replaying misspeculated instructions causes a decrease in efficiency of the processor and an increase in power consumption.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-5 illustrate example techniques for suppressing the scheduling of dependent instructions of a load instruction in situations where the load instruction returns an invalid status. In some embodiments, the processor maintains data regarding the dependency of instructions in its scheduler queue. Upon identification of the invalid status of the load instruction, the dependency information may be used to suppress dependent instructions that were awoken based on the load instruction to prevent their execution. The dependency tracking and subsequent suppression may span multiple levels of dependency.

Conventionally, processors attempt to improve performance by speculatively executing instructions. For example, when a load instruction is selected for execution, a tag associated with the load instruction is broadcasted to the scheduler to awake instructions that are dependent on the load instruction. Such dependent instructions may have an operand that corresponds to the register into which the load instruction loads data. Broadcasting the identifier for the load instruction may include broadcasting the register name to the scheduler. The scheduler may awake those instructions referencing the same register. Dependent instructions may also awake their own dependent instructions, causing the chain of instructions that are awoken for execution to cross multiple levels. If the initial load instruction returns an invalid status, it may need to be replayed after the condition leading to the invalid status is resolved. In some embodiments, an invalid status indication may result from a data cache miss, a store-to-load forwarding error due to the store data not being ready or replay safe, store-to-load forwarding retries, or a miss in the translation lookaside buffer (i.e., TLB—stores information for virtual to physical address translations). The dependent instructions that were awoken subsequent to the load instruction also have invalid status and would need to be replayed. Replaying instructions consumes processing resources and power, thereby reducing system performance. As disclosed further herein, by tracking dependency information, dependent instructions may be suppressed upon identifying an invalid status associated with the load instruction. The suppressed instructions may be awoken again and subsequently executed after the load is replayed.

Figure 1:
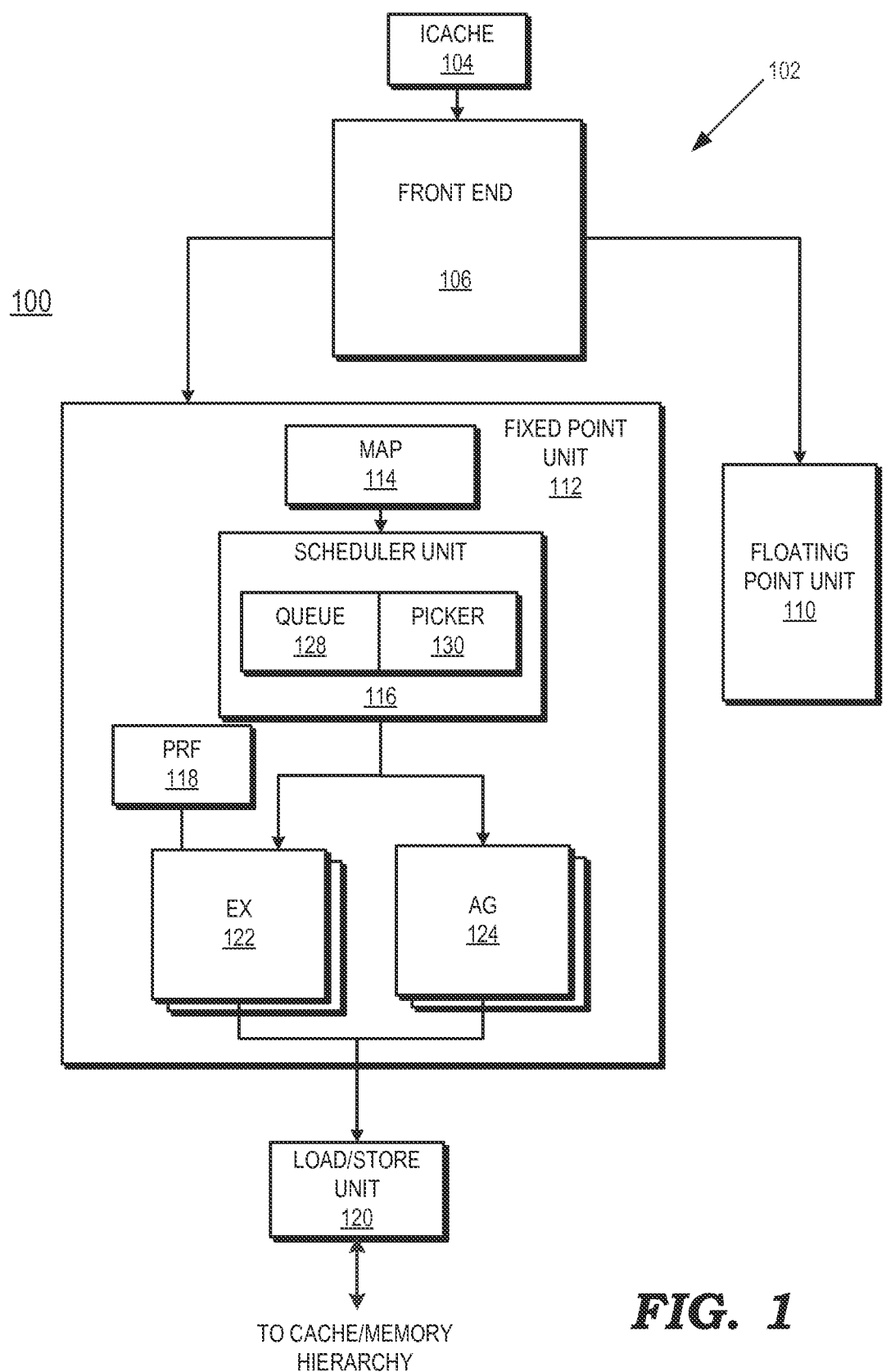
FIG. 1 is a block diagram of a processor core in accordance with some embodiments.

FIG. 1 illustrates a processor core 100 of a processor having an execution pipeline 102 that implements dependent instruction suppression in accordance with some embodiments. The illustrated processor core 100 can include, for example, a central processing unit (CPU) core based on an x86 instruction set architecture (ISA), an ARM ISA, and the like. The processor can implement a plurality of such processor cores, and the processor can be implemented in any of a variety of electronic devices, such as a notebook computer, desktop computer, tablet computer, server, computing-enabled cellular phone, personal digital assistant (PDA), set-top box, and the like.

In the depicted example, the execution pipeline 102 includes an instruction cache 104, a front end 106, one or more floating point units 110, and one or more fixed point units 112 (also commonly referred to as "integer execution units"). The processor core 100 also includes a load/store unit (LSU) 120 connected to a memory hierarchy, including one or more levels of cache (e.g., L1 cache, L2, cache, etc.), a system memory, such as system RAM, and one or more mass storage devices, such as a solid-state drive (SSD) or an optical drive.

The instruction cache 104 stores instruction data which is fetched by a fetch unit of the front end 106 in response to demand fetch operations (e.g., a fetch to request the next instruction in the instruction stream identified by the program counter) or in response to speculative prefetch operations. The front end 106 decodes instructions fetched by the fetch unit into one or more operations that are to be performed, or executed, by either the floating point unit 110 or the fixed point unit 112. In a microcoded processor architecture, this decoding can include translating the instruction into one or more micro-operations (uOps), whereby each uOp is identified by a corresponding opcode value and can be separately executed within the fixed point unit 112. Those operations involving floating point calculations are dispatched to the floating point unit 110 for execution, whereas operations involving fixed point calculations are dispatched to the fixed point unit 112.

The fixed point unit 112 includes a map unit 114, a scheduler unit 116, a physical register file (PRF) 118, and one or more execution (EX) units 122, such as one or more arithmetic logic units (ALUs), and one or more address generation (AG) units 124. The PRF 118 stores a set of physical registers, each of which is associated with a different physical register name (PRN). For convenience, as used herein the PRN can refer to the name of the physical register, and can refer to the physical register that has that name. Thus, for example, "storing data at a PRN" indicates that the data is stored at the physical register identified by the PRN.

The scheduler unit 116 includes a scheduler queue 128 and a picker 130. In an operation of the fixed point unit 112, the map unit 114 receives operations from the front end 106 (usually in the form of operation codes, or opcodes). These dispatched operations typically also include, or reference, operands used in the performance of the represented operation, such as a memory address at which operand data is stored, an architected register at which operand data is stored, one or more constant values (also called "immediate values"), and the like. The map unit 114 and the scheduler unit 116 control the selective distribution of operations among the EX units 122 and AG units 124, whereby operations to be performed are queued in the scheduler queue 128 and then picked therefrom by the picker 130 for issue to a corresponding EX unit or AG unit. Typically, each queue entry of the scheduler queue 128 includes a field to store the operation payload or operation identifier (e.g., the opcode for the operation), fields for the addresses or other identifiers of physical registers that contain the source operand(s) for the operation, fields to store any immediate or displacement values to be used with the operation, a destination field that identifies the physical register in which the result of the execution of the corresponding operation is to be stored, and at least one field to store instruction dependency information. For example, a load instruction includes address information indicating the target of the load instruction and an architected register operand indicating the PRN that receives the data from the target address.

As used herein, Instruction B is dependent on Instruction A if a source operand of Instruction B matches a destination operand of Instruction A, and there are no intervening instructions having the same destination operand as Instruction A. Thus, a load instruction is dependent on a store instruction if the load instruction loads data from a memory address targeted by the store instruction (as indicated by the destination operand of the store instruction), and there are no intervening instructions that store data to the memory address. For example, in the following instruction sequence:

| | |
|---|---|
| ST [mem], RAX | (STORE1) |
| LD RBX, [mem] | (LOAD1) |
| ADD RCX, RBX | (ADD1) |
| ADD RCX, RDX | (ADD2) |
| LD RBX, [mem] | (LOAD2) | the LOAD1 and LOAD2 instructions are both dependent on the STORE1 instruction because the LOAD1 and LOAD2 instructions both load data from the memory address indicated by the destination operand of the STORE1 instruction, and there are no intervening instructions that store data to the memory address. In addition, the ADD1 instruction is dependent on the LOAD1 instruction because the ADD1 instruction uses the destination operand (RBX) of the LOAD1 instruction as one of its source operands. ADD2 is dependent on ADD1 as it uses the destination operand (RCX) of the ADD1 instruction. As used herein, instructions that are dependent on a given load instruction, or that are dependent on instructions that are dependent on the given load instruction, are referred to as the children of the load instruction. The ADD2 is dependent on the ADD1 instruction, which is itself dependent on the LOAD1 instruction. The ADD2 instruction is thus a second generation dependent of the LOAD instruction.

Prior to storing an operation in the scheduler queue 128, the map unit 114 performs register renaming whereby external operand names (i.e., architected register names (ARNs)) are translated into internal operand names (i.e., PRNs). This renaming process includes the map unit 114 evaluating a subset of operations including the operation to be queued to identify some dependencies between sources and destinations associated with the operations, and then mapping architected registers to physical registers so as to avoid false dependencies and facilitate parallel execution of independent operations as using register renaming techniques known in the art.

The picker 130 monitors the scheduler queue 128 to identify operations ready for execution, and upon picking an available operation and verifying its operands are ready and available, dispatches the operation to an EX unit or an AG unit. The picker 130 waits to pick operations for a dependent instruction until it receives an indication that the operations for the instructions from which the dependent instruction depends have been satisfied. In response to receiving the indication, the picker 130 sets a status of the dependent instruction from sleep to awake to indicate that it can be picked for execution, and picks the dependent instruction according to the availability of the requisite EX unit or AG unit. This setting of the status for the dependent instruction is sometimes referred to as "waking" the dependent instruction. As described in greater detail herein, the dependents of a load instruction may be suppressed after an indication is received that the load had an invalid status. The dependents may be suppressed by placing them back to an idle or sleep status within the scheduler queue 128.

Operations requiring retrieval or storage of data, such as load or store operations, are dispatched by the picker 130 to an AG unit 124, which calculates the memory address associated with the operation and directs the LSU 120 to perform the corresponding memory access using the generated address. Operations requiring numerical manipulations or other arithmetic calculations are dispatched to the appropriate EX unit 122 for execution.

The address generation operations performed by the AG units 124 and the arithmetic operations performed by the EX units 122 typically utilize operand data, in the form of one or both of operands stored in source registers or immediate/displacement values. The immediate/displacement value used during execution operation is dispatched to the EX/AG unit along with the operation from the scheduler queue 128. The source operands stored in the physical registers are read from the PRF 118 and provided to the corresponding EX/AG unit for use in executing the operation. Typically, these source operands are obtained by initiating a PRF read to the PRF 118.

Load operations performed by the AG unit 124/LSU 120 and arithmetic operations performed by the EX unit 122 result in data that is to be stored in the physical register identified as the destination of the load operation or arithmetic operation. Accordingly, each of the EX unit 122 and the LSU 120, upon generating a result (either by completing an arithmetic operation for the EX unit 122 or by loading data from the memory hierarchy for the LSU 120), initiates a PRF write to the destination PRN of the load instruction.

For store instructions, the picker 130 picks a movement operation associated with the store instruction to cause the EX unit 122 to move the data from the register to the LSU 120. The LSU 120 places the store data into a store queue, and communicates with the memory hierarchy to store the data at the calculated memory address.

In some embodiments, the scheduler unit 116 awakes dependents of a load instruction responsive to the picker 130 selecting the load instruction for execution. In some cases, the load instruction may be dependent on a previous store instruction. It is possible that the store instruction preceding the picked load instruction is not valid because it has failed to generate an address, data, or some other state. The execution of the load instruction, when the store instruction has not yet been processed results in a load failure, and the load instruction is subject to replay. Because the dependents of the load instruction, and possibly the dependent's dependents were also awoken when the load instruction was picked, they may also need to be replayed. Replaying the instructions associated with the load failure consumes processing resources and power. To reduce the replay load, the scheduler unit 116 uses dependency information maintained in the scheduler queue 128 to identify and suppress dependents of a load instruction having invalid status. The suppressed instructions may be awoken and subsequently picked after the load instruction is replayed.

Figure 2:
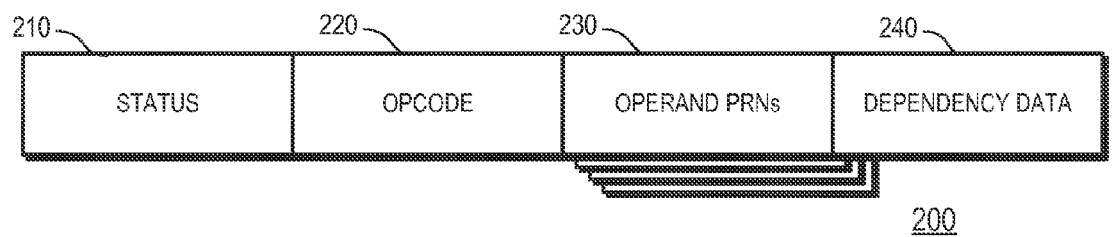
FIG. 2 is a block diagram of an entry of a scheduler queue of the processor core of FIG. 1 in accordance with some embodiments.

FIG. 2 illustrates a scheduler queue entry 200 in some embodiments. The scheduler queue entry includes a status field 210, an opcode field 220, operand physical register (PRN) fields 230, and a dependency field 240.

The status field 210 provides a status indicator of the instruction in the scheduler queue 128. The values of the status field 210 are used by the picker 130 to determine the eligibility of the instruction for scheduling. For example, a status of AWAKE indicates that the instruction is available to be scheduled for execution. A status of SLEEP indicates that the instruction is a dependent of a different instruction that has not yet progressed to a state of completion that triggers the awakening of its dependents. A status of INVALID indicates that an error has occurred with the instruction, and that it may need to be replayed.

The opcode field 220 indicates the operation specified by the instruction. The operand physical register fields 230 indicate the PRNs specified by the operands of the instruction. The number of operand physical register fields 230 may vary depending on the particular architecture of the processor core 100. For purposes of the following illustrations, the number of operand physical register fields 230 is assumed to be four. Accordingly, a given instruction could have a dependency relationship with four other instructions.

When a load instruction is selected by the picker 130, dependents of the load instruction are awoken by setting their status field 210 value to AWAKE. In some embodiments, the PRN of the load instruction that is picked by the picker 130 is matched to the PRN of the other entries in the scheduler queue 128 to identify matches and awake the matching instructions.

The dependency field 240 stores information regarding the other instruction or instructions on which the instruction specified in the entry 200 depends. As described in greater detail below, in some embodiments, the dependency field 240 may store data regarding all the dependency relationships for the instruction associated with the entry, while in some embodiments, the dependency information may be reduced. For example, the reduced dependency information may indicate the most recently picked instruction that the subject of the entry 200 depends upon. Upon receiving an indication of an invalid status condition for a particular instruction that was scheduled for execution by the picker 130, the scheduling queue 128 uses the dependency field 240 to suppress the dependents that were awoken for the parent associated with the invalid status. For example, an invalid status may be the result of a data cache miss, a store-to-load forwarding error, a store-to-load forwarding retry, or a miss in the TLB.

In some embodiments, the dependency field 240 may include one bit for every entry in the scheduler queue 128 less one for the current entry. Hence, the dependency field 240 may represent a dependency vector spanning the entire scheduler queue 128.

Figure 3:
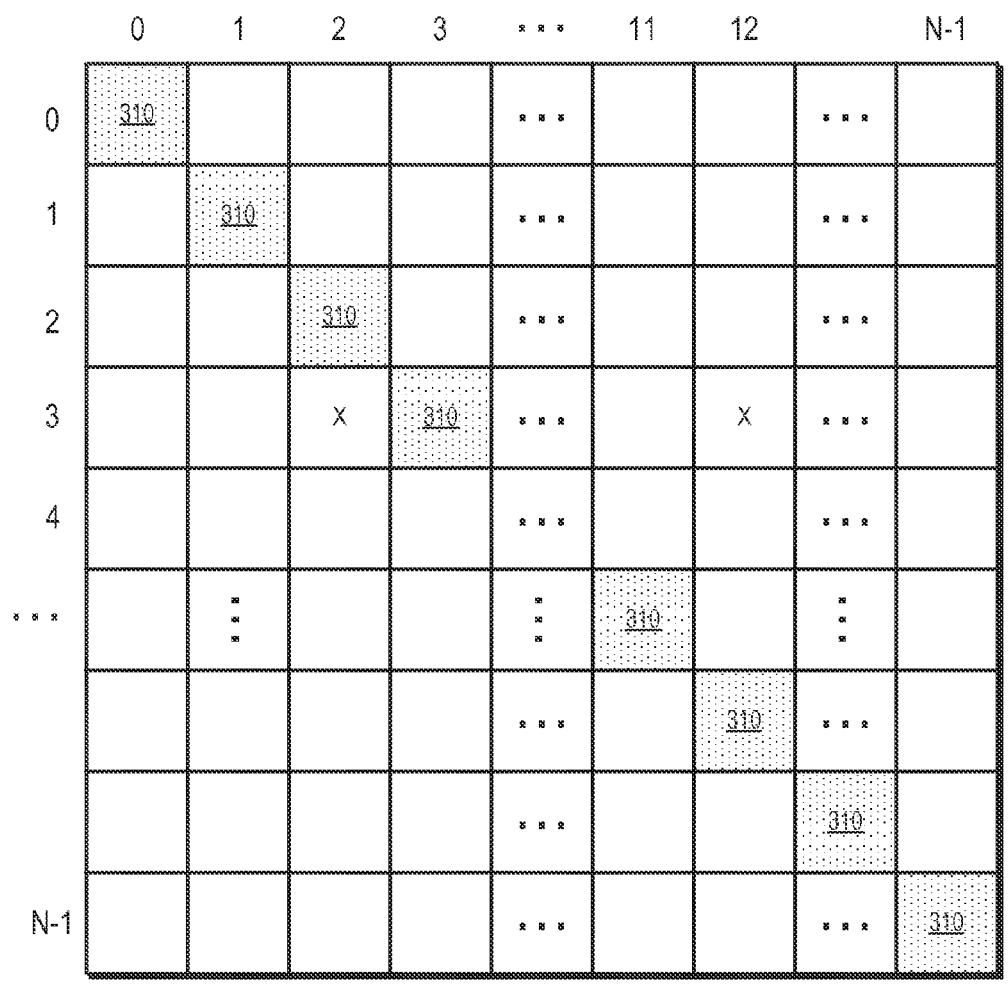
FIG. 3 is a diagram illustrating a dependency matrix for tracking dependency relationships between entries in a scheduler queue of the processor core of FIG. 1 in accordance with some embodiments.

FIG. 3 is a diagram illustrating a dependency matrix 300 for tracking dependency relationships between entries in a scheduler queue of the processor core of FIG. 1 in accordance with some embodiments. The collection of dependency fields 240 for the entries 200 in the scheduler queue 128 can be represented as a dependency matrix 300 including the individual dependency vectors. For ease of understanding, a placeholder 310 may be inserted in the matrix to represent the current entry. Note, however, that the dependency field 240 does not include a bit for the current entry corresponding to the placeholder 310. The number of bits in the dependency matrix is $N^2-N$, where N is the number of entries in the scheduler queue 128.

In some embodiments, the map unit 114 maps the dependencies of the scheduler queue entry 200 with respect to other scheduler queue entries when the instruction is added to the scheduler queue 128. For example, if the instruction in entry 3 is dependent on entries 2 and 12, the corresponding bits are set in bits 2 and 12 are set by the map unit 114 in the scheduler queue entry 200 (FIG. 2). In the illustrated example, the instruction may include four operands, so four bits may be set for a given entry in its dependency field 240. The use of the dependency matrix 300 maintains all possible dependencies across the entries 200 in the scheduler queue 128. When a dependent instruction is itself dependent on a non-load instruction (i.e., a second or higher generation dependent instruction from an ancestor load instruction), the dependency field 240 for the parent instruction is copied to the scheduler queue entry 200 for the dependent instruction to preserve the multi-generation dependency information. In the pseudo-code example above, the ADD2 instruction is dependent on the ADD1 instruction, which in turn is dependent on the LOAD1 instruction. For the entry associated with the ADD1 instruction the bit associated with the LOAD1 instruction would be set. For the entry associated with the ADD2 instruction, the bit would be set for the entry associated with the ADD1 instruction, and the bit for the LOAD1 instruction would be copied from the scheduler queue entry 200 for the ADD1 instruction, resulting in bits being set for both the LOAD1 instruction and the ADD1 instruction.

If a load instruction generates an invalid status result, indicating a load failure, the dependency matrix 300 may be employed by the scheduler unit 116 to identify any dependents of the load instruction. For example, a load failure may occur if the store instruction that stores the data that is the target of the load instruction had not yet completed, so the data is unavailable. The entry number of the load instruction in the scheduler queue 128 is used to access the dependency matrix 300 to identify any other instructions that were indicated to be dependent on the load instruction responsive to their bits in the dependency field 240 corresponding to the load instruction's entry number being set. The status fields 210 for the dependent instructions, which had been set to AWAKE based on the picking of the load instruction (e.g., based on the PRN of the load instruction), are changed by the scheduling unit 116 back to SLEEP to suppress them, thus preventing their execution. Any dependent instructions that had already been picked for execution by the picker 130 prior to receiving the invalid status would need to be replayed after the load instruction is replayed, however, the consequences of the invalid status load are reduced because the dependent instructions that are still present in the scheduler queue 128 are suppressed before they can be executed. The suppression of dependents thus interrupts the wave front of instructions.

When the execution of a particular instruction is completed with valid status, the bits in the dependency matrix 300 for the associated entry are cleared, so that the other instructions are no longer indicated as being dependent on the completed instruction and so the de-allocated entry may be reused by a new instruction.

In some embodiments, a simplified dependency tracking technique may be implemented by storing one or more replay tags in the dependency field 240. When the picker 130 picks an instruction that has dependents, such as a load instruction, the scheduler queue 128 awakes the dependents and stores a replay tag for the parent instruction in the dependency field 240 of the dependents that were awoken. In some embodiments, the replay tag may be an arbitrary identifier, such as a number. For example, if the parent instruction is a load request, the picker 130 broadcasts the PRN associated with the load request to the scheduler queue 128, and dependent instructions having a matching PRN are awoken by setting their status fields 210 to AWAKE and their dependency fields 240 to the value corresponding to the replay tag. The dependency field 240 thus stores at least one replay tag associated with the entry 200. For a second or greater generation dependent whose immediate parent is not a load, the replay tag of the ancestor load instruction is used. For example, the ADD1 and ADD2 instructions are both assigned the replay tag of the LOAD1 instruction. When the picker 130 picks a non-load instruction, it reads the replay tag of the instruction it is picking and broadcasts it along with the destination PRN it normally broadcasts to awake its dependent instructions. In response to an awake event, a dependent instruction takes the broadcasted replay tag and stores it as its own replay tag.

In some embodiments, the dependency field 240 may store multiple dependency fields, so dependency can be tracked for more than one parent instruction. In such cases, assuming the dependency field 240 is configured to store two entries, the first two replay tags are stored in the dependency field 240. A third replay tag replaces the first replay tag, such that the dependency field 240 stores the most recent replay tags. A bit in the dependency field 240 may be used to identify which of the two replay tags is the oldest to allow it to be replaced by a subsequent replay tag. For example, if the maximum number of operands for a given instruction is four, the dependency field 240 may store the two loads most recently picked by the picker 130 for execution. If more than two replay tags are included in the dependency field 240, additional bits may be used to track the replacement order.

If a load instruction generates an invalid status result, indicating a load failure, the replay tag of the load instruction is used by the scheduler queue 128 to identify any dependents of the load instruction having a matching replay tag stored in the dependency field 240. The status fields 210 for the dependent instructions, which had been set to AWAKE based on the picking of the load instruction (e.g., based on the PRN of the load instruction), are changed by the scheduling unit 116 back to SLEEP to suppress them and prevent their execution. Any dependent instructions that had already been picked for execution by the picker 130 prior to receiving the invalid status would need to be replayed after the load instruction is replayed, however, the consequences of the invalid status load are reduced because the dependent instructions that are still present in the scheduler queue 128 are suppressed before they can be executed, thereby interrupting the wave front of instructions.

The scheduler unit 116 tracks the replay tags of the pending load instructions so that its dependents may be suppressed in the event of an invalid status condition for the load instruction. In some embodiments, the scheduler unit 116 may track for each pipe and each stage of each pipe the associated replay tag for a given load instruction in the corresponding pipe/stage. So, if there are two load pipes of four stages each, there would be 8 banks of flip flops that hold a valid and an encoded value of the replay tag in that pipe/stage. As the load instruction advances down the stages, a bank would pass along the replay tag to the next bank of flops to model the progress of the load instruction. When the load instruction hits the final stage in which status is known, action can be taken. If the load instruction has valid status, the replay tag is released. If the load instruction has invalid status, the replay tag is compared against the dependent instructions in the scheduler queue 128 that are awake to send matching dependents back to sleep.

In some embodiments, an array of flip flops can be built which are indexed by replay tag. The contents of each entry describes an encoded value of the pipe and stage for that particular index. As the load instruction progresses down the pipe, the contents of that entry are modified to track the stage of the load instruction. When the encoded value represents the stage during which status is known, the status can be observed and the proper action taken as described above. With 2 load pipes of 4 stages each, each entry would need a valid bit and 3 bits of encoding to represent each of the different pipes/stages a load instruction can be in. The scheduler unit 116 tracks replay tags that are used or those that are free to allow for allocation and de-allocation of the replay tags. The valid bits act as a freelist (invalid entries are free). The scheduler unit 116 may use the valid bits to identify a free replay tag to allocate to a newly picked load instruction about to flow down the pipe. When a load instruction completes with good status, the replay tag is de-allocated and the valid bit is de-asserted to place it back on the freelist.

The replay tag tracking information for a given load instruction may also be used to terminate dependent instructions that have already started execution. Since a non-load dependent instruction inherits the replay tag of the ancestor load instruction, it is also tracked through the execution pipeline. In an embodiment using the dependency matrix 300, the tracking would cover all of the entries 200. The replay tag or dependency matrix information may be used by the scheduler unit 116 to signal the execution unit 122 or address generation unit 124 to terminate execution of a dependent having a replay tag or dependency bit matching the load instruction having invalid status. The flip flop schemes described above may be used to track dependency matrix data or replay tags to indicate which instructions are present in each pipeline stage. When an invalid status is received, the scheduler unit 116 use the pipeline tracking information to determine the pipe/stage of dependents of the invalid status load instruction and signal the execution unit 122 or address generation unit 124 to terminate the dependent instruction that has already started executing. This termination reduces power consumption by halting the execution of instructions that will also have an invalid status due to the invalid status of the ancestor load instruction.

Figure 4:
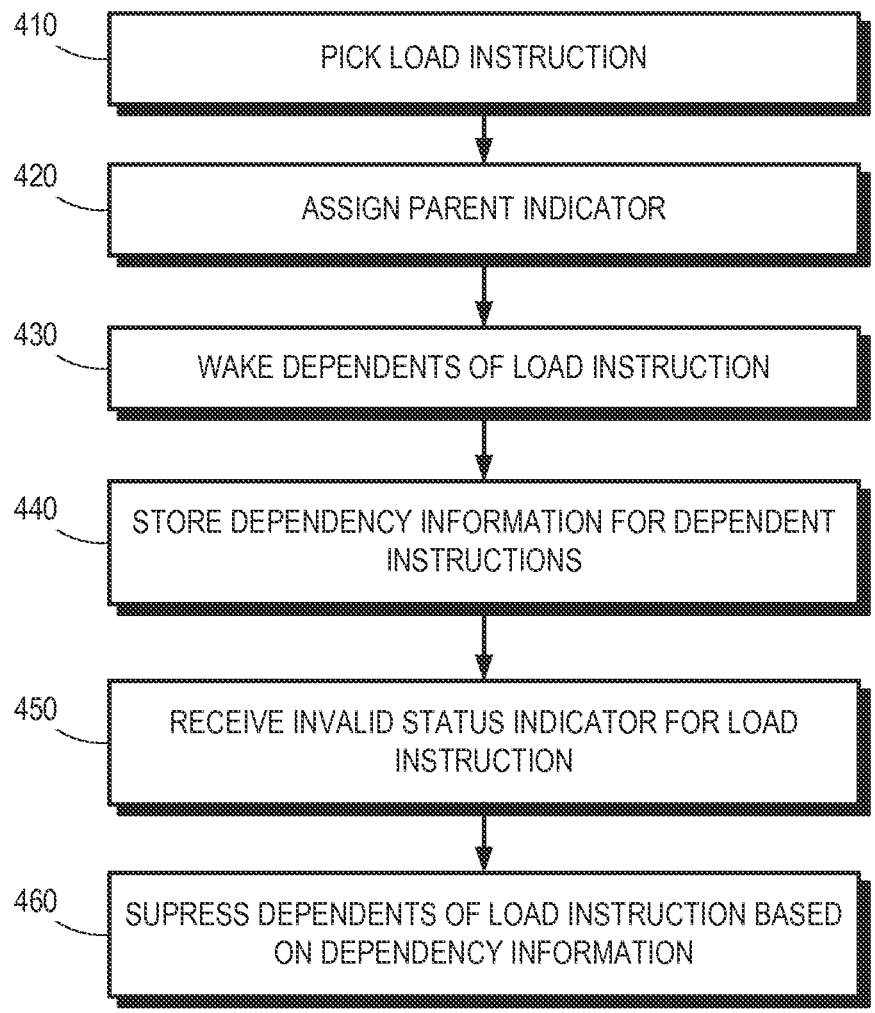
FIG. 4 illustrates a flow diagram of a method for suppressing dependent instructions using dependency data in accordance with some embodiments.

FIG. 4 illustrates a flow diagram of a method 400 for suppressing dependent instructions using dependency data in accordance with some embodiments. In method block 410, a load instruction is picked for execution by the picker 130. In an embodiment using replay tags, the scheduler queue 128 assigns a replay tag for the load instruction. In embodiments using the dependency matrix 300, method block 420 may be omitted. In method block 430, the dependents of the load instruction are awoken by setting their status fields 210 to AWAKE. The PRN associated with the load instruction may be used to awake dependent instructions referencing the same PRN. In method block 440, dependency information is stored for the dependent instructions. In an embodiment using the dependency matrix 300, the map unit 114 may populate the dependency fields 240 to identify the dependency relationships. In an embodiment using replay tags, the scheduler unit 116 assigns the replay tag for the load instruction and stores the value in the dependency fields 240 of the awoken instructions. If multiple load instructions are picked that have dependency relationships with the same dependent instruction, the dependency field 240 may store the most recently picked parent instruction or instructions.

In method block 450, an invalid status condition is registered for the load instruction. The invalid status corresponds to a load failure. The load instruction may experience a failure if a store instruction preceding the load instruction has not completed, so the data for the load instruction is unavailable. In method block 460, dependents of the load instruction are suppressed based on the stored dependency information. In an embodiment using the dependency matrix 300, the status fields 210 for the dependent instructions having a bit set corresponding to the failed load instruction are changed to a SLEEP status. In an embodiment using replay tags, the picker 130 sends the replay tag of the failed load instruction to the scheduler queue 128, which changes the status field 210 of any dependent instructions having the same replay tag stored in their dependency fields 240 to SLEEP. Supressing the dependent instructions may also include terminating dependent instructions that have begun executing. When the load instruction is subsequently replayed, the dependents will be awoken again when the load instruction is picked, as described above for the first time the dependents were awoken.

By placing dependent instructions in to a sleep state upon indication of a load failure, the expenditure of processor resources on instructions that will need to be replayed with the failed load instruction is avoided. The processor resources may be used to execute other instructions. Suppressing dependent instructions in this manner increases processor performance and reduces power consumption.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
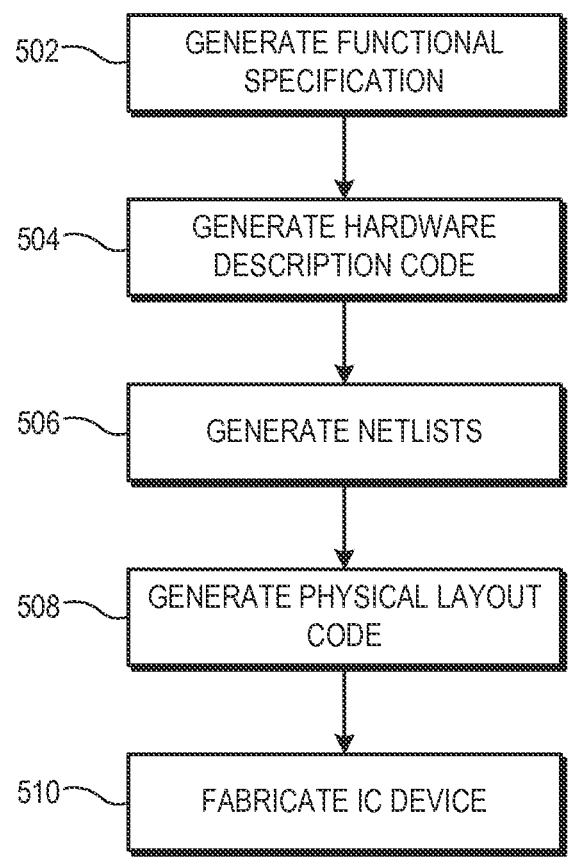
FIG. 5 is a flow diagram illustrating a method for designing and fabricating an integrated circuit device implementing at least a portion of a component of a processor in accordance with some embodiments.

FIG. 5 is a flow diagram illustrating an example method 500 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes suppressing execution of at least one dependent instruction of a load instruction by a processor using stored dependency information responsive to an invalid status of the load instruction.

As disclosed herein, in some embodiments a method includes storing dependency information identifying a dependency relationship between a load instruction and at least one dependent instruction, scheduling the load instruction for execution by a processor, waking the at least one dependent instruction, receiving indication of an invalid status of the load instruction, and suppressing execution of the least one dependent instruction by the processor responsive to the indication of the invalid status based on the dependency information. The dependency relationship covers one or more levels of dependency.

As disclosed herein, in some embodiments a processor includes an instruction pipeline having an execution unit to execute instructions and a scheduler. The scheduler to select for execution in the execution unit a load instruction having at least one dependent instruction and suppress execution of the at least one dependent instruction using stored dependency information responsive to an invalid status of the load instruction.

As disclosed herein, in some embodiments a non-transitory computer readable medium stores code to adapt at least one computer system to perform a portion of a process to fabricate at least part of a processor. The processor includes an instruction pipeline having an execution unit to execute instructions and a scheduler. The scheduler to select for execution in the execution unit a load instruction having at least one dependent instruction and suppress execution of the at least one dependent instruction using stored dependency information responsive to an invalid status of the load instruction.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
in response to an invalid status of a load instruction indicating that a memory subsystem is not ready to provide data for the load instruction, suppressing execution of at least one dependent instruction of the load instruction by a processor using stored dependency information; and
waking the at least one dependent instruction responsive to subsequently scheduling the load instruction for execution, wherein waking the at least one dependent instruction comprises setting a status indicator of the at least one dependent instruction to awake and suppressing execution of the at least one dependent instruction comprises setting the status indicator to sleep.

2. A method comprising:
storing dependency information in an entry of a scheduler queue for at least one dependent instruction of a load instruction, wherein a dependency relationship between the load instruction and the at least one dependent instruction covers one or more levels of dependency, and wherein the dependency information comprises a plurality of bits associated with entries in the scheduler queue other than the entry for the at least one dependent instruction, and a bit of the plurality of bits corresponding to an entry in the scheduler queue for the load instruction is set in the dependency information; and
in response to an invalid status of the load instruction indicating that a memory subsystem is not ready to provide data for the load instruction, suppressing execution of the at least one dependent instruction by a processor using stored dependency information.

3. A method comprising:
in response to an invalid status of a load instruction indicating that a memory subsystem is not ready to provide data for the load instruction, terminating execution of at least one dependent instruction of the load instruction by a processor using stored dependency information, wherein the invalid status indicates any one or more of:
    a data cache miss in association with the data for the load instruction;
    a store-to-load forwarding error in association with the data for the load instruction; and
    a miss in a translation lookaside buffer in association with the data for the load instruction.

4. A method comprising:
storing dependency information identifying a dependency relationship between a load instruction and at least one dependent instruction, wherein the dependency relationship covers one or more levels of dependency, and wherein the dependency information comprises a plurality of bits associated with entries in a scheduler queue other than an entry for the at least one dependent instruction, and a bit of the plurality of bits corresponding to an entry in the scheduler queue for the load instruction is set in the dependency information;
scheduling the load instruction for execution by a processor;
waking the at least one dependent instruction;
receiving an indication of an invalid status of the load instruction, the invalid status indicating that a memory subsystem is not ready to provide data for the load instruction; and
suppressing execution of the least one dependent instruction by the processor responsive to the indication of the invalid status based on the dependency information.

5. A processor comprising:
an instruction pipeline, comprising:
    an execution unit to execute instructions;
    a scheduler to select for execution in the execution unit a load instruction having at least one dependent instruction and suppress execution of the at least one dependent instruction using stored dependency information responsive to an invalid status of the load instruction, the invalid status indicating that a memory subsystem is not ready to provide data for the load instruction; and
    wherein the scheduler is to wake the at least one dependent instruction responsive to subsequently scheduling the load instruction for execution, wherein the scheduler is to wake the at least one dependent instruction by setting a status indicator of the at least one dependent instruction to awake and suppress execution of the at least one dependent instruction by setting the status indicator to sleep.

6. A processor comprising:
an instruction pipeline, comprising:
    an execution unit to execute instructions;
    a scheduler to select for execution in the execution unit a load instruction having at least one dependent instruction and suppress execution of the at least one dependent instruction using stored dependency information responsive to an invalid status of the load instruction, the invalid status indicating that a memory subsystem is not ready to provide data for the load instruction,
    wherein the scheduler comprises a scheduler queue and the scheduler is to store the dependency information in an entry of the scheduler queue for the at least one dependent instruction;
    wherein a dependency relationship between the load instruction and the at least one dependent instruction covers one or more levels of dependency; and
    wherein the dependency information comprises a plurality of bits associated with entries in the scheduler queue other than the entry for the at least one dependent instruction, and the scheduler is to set a bit of the plurality of bits corresponding to an entry in the scheduler queue for the load instruction.

7. A processor comprising:
an instruction pipeline, comprising:
    an execution unit to execute instructions; and
    a scheduler to select for execution in the execution unit a load instruction having at least one dependent instruction and suppress execution of the at least one dependent instruction using stored dependency information responsive to an invalid status of the load instruction, the invalid status indicating that a memory subsystem is not ready to provide data for the load instruction, and wherein the scheduler is to suppress execution of the at least one dependent instruction by informing the execution unit to terminate execution of the at least one dependent instruction.

8. The method of claim 1, wherein waking the at least one dependent instruction further comprises:
comparing a first register name referenced by the load instruction to a second register name referenced by the at least one dependent instruction; and waking the at least one dependent instruction responsive to the first register name matching the second register name.

9. The method of claim 1, further comprising:
storing the dependency information in an entry of a scheduler queue for the at least one dependent instruction, wherein a dependency relationship between the load instruction and the at least one dependent instruction covers one or more levels of dependency.

10. The method of claim 1, wherein the dependency information comprises a replay tag associated with the load instruction, the method further comprising:
assigning the replay tag to the load instruction; and
assigning the replay tag to the at least one dependent instruction.

11. The method of claim 10, further comprising:
waking a second instruction responsive to waking the at least one dependent instruction, the second instruction being dependent on the at least one dependent instruction;
assigning the replay tag to the second instruction; and
suppressing execution of the second instruction responsive to an indication of the invalid status based on the replay tag.

12. The method of claim 4, further comprising:
assigning a replay tag to the load instruction; and
assigning the replay tag to the at least one dependent instruction.

13. The method of claim 12, further comprising:
waking a second instruction responsive to waking the at least one dependent instruction, the second instruction being dependent on the at least one dependent instruction;
assigning the replay tag to the second instruction; and
suppressing execution of the second instruction responsive to the indication of the invalid status based on the replay tag.

14. The processor of claim 5, wherein the scheduler is to wake the at least one dependent instruction by comparing a first register name referenced by the load instruction to a second register name referenced by the at least one dependent instruction and waking the at least one dependent instruction responsive to the first register name matching the second register name.

15. The processor of claim 5, wherein the scheduler comprises a scheduler queue and the scheduler is to store the dependency information in an entry of the scheduler queue for the at least one dependent instruction, wherein a dependency relationship between the load instruction and the at least one dependent instruction covers one or more levels of dependency.

16. The processor of claim 15, wherein the dependency information comprises a replay tag associated with the load instruction, and the scheduler is to assign the replay tag to the load instruction and assign the replay tag to the at least one dependent instruction.

17. The processor of claim 16, wherein the scheduler is to wake a second instruction responsive to waking the at least one dependent instruction, the second instruction being dependent on the at least one dependent instruction, assign the replay tag to the second instruction, and suppress execution of the second instruction responsive to an indication of the invalid status based on the replay tag.

18. The processor of claim 7, wherein the invalid status indicates any one or more of:
a data cache miss in association with the data for the load instruction;
a store-to-load forwarding error in association with the data for the load instruction; and
a miss in a translation lookaside buffer in association with the data for the load instruction.

19. The method of claim 1, wherein the invalid status indicates any one or more of:
a data cache miss in association with the data for the load instruction;
a store-to-load forwarding error in association with the data for the load instruction; and
a miss in a translation lookaside buffer in association with the data for the load instruction.

20. The method of claim 4, wherein the invalid status indicates any one or more of:
a data cache miss in association with the data for the load instruction;
a store-to-load forwarding error in association with the data for the load instruction; and
a miss in a translation lookaside buffer in association with the data for the load instruction.

21. The method of claim 2, wherein the invalid status indicates any one or more of:
a data cache miss in association with the data for the load instruction;
a store-to-load forwarding error in association with the data for the load instruction; and
a miss in a translation lookaside buffer in association with the data for the load instruction.

22. The processor of claim 5, wherein the invalid status indicates any one or more of:
a data cache miss in association with the data for the load instruction;
a store-to-load forwarding error in association with the data for the load instruction; and
a miss in a translation lookaside buffer in association with the data for the load instruction.

23. The processor of claim 6, wherein the invalid status indicates any one or more of:
a data cache miss in association with the data for the load instruction;
a store-to-load forwarding error in association with the data for the load instruction; and
a miss in a translation lookaside buffer in association with the data for the load instruction.

* * * * *